United States Patent [19]
Okada et al.

[11] 4,118,736
[45] Oct. 3, 1978

[54] METHOD OF AND APPARATUS FOR CONTROLLING THE OPTICAL READING OF RECORDED INFORMATION

[75] Inventors: Hitoshi Okada, Yotsukaido; Yohsuke Naruse, Tokyo, both of Japan

[73] Assignee: Sony Corporation, Tokyo, Japan

[21] Appl. No.: 837,465

[22] Filed: Sep. 28, 1977

[30] Foreign Application Priority Data

Oct. 1, 1976 [JP] Japan .............................. 51-120607

[51] Int. Cl.$^2$ .............................................. G11B 7/00
[52] U.S. Cl. ........................... 358/128; 179/100.3 V; 365/215; 250/201
[58] Field of Search .............. 179/100.3 V; 358/128; 250/201; 365/215, 216, 234

[56] References Cited

U.S. PATENT DOCUMENTS

| 3,876,841 | 4/1975 | Kramer et al. | 179/100.3 V |
| 3,969,575 | 7/1976 | Gerritsen et al. | 179/100.3 V |
| 3,974,327 | 8/1976 | Van Dijk | 179/100.3 V |

*Primary Examiner*—Bernard Konick
*Assistant Examiner*—Donald McElheny
*Attorney, Agent, or Firm*—Lewis H. Eslinger; Alvin Sinderbrand

[57] ABSTRACT

Information which is recorded on a record medium is read therefrom by a main beam of radiant energy, such as a main light beam, which impinges and scans the record medium so as to be modulated with the recorded information. An additional beam of radiant energy also impinges upon the record medium, and both the main and additional beams pass through a common objective lens which focusses the beams. The main beam, after impinging upon the record medium and being modulated with the recorded information, is detected. The transmission path of the main beam, and particularly its impinging location on the record medium, is controlled in accordance with the detection thereof. Also, the additional beam is detected after it impinges upon the record medium. The effective focussing position of the objective lens is adjusted in accordance with the detected additional beam. Defocussing of the main beam which may occur in the event that its transmission path is adjusted is minimized by further adjusting the effective focussing position of the objective lens as a function of the adjustment of the transmission path of the main beam.

14 Claims, 8 Drawing Figures

METHOD OF AND APPARATUS FOR CONTROLLING THE OPTICAL READING OF RECORDED INFORMATION

BACKGROUND OF THE INVENTION

This invention relates to a method of and apparatus for controlling the optical reading of information which is recorded on a record medium and, more particularly, to such a method and apparatus wherein the focussing of a beam of radiant energy which is used to read the recorded information is adjusted to compensate for defocussing effects which may arise because of changes in the beam transmission path.

Techniques are known wherein information is recorded on a record medium in a form capable of being reproduced, or read, by a light beam. As one example, video information is recorded in concentric, circular or spiral tracks on a rotatable disc, the information being in the form of modulated pits which are detectable by transmitting a light beam, such as a laser beam, onto the circular tracks, whereby the intensity of the light beam is modulated by the pits. If this modulated light beam then is reflected from the disc, the recorded information can be recovered by detecting the intensity modulations of the reflected beam. In other types of optical record media, information, which may be digital or analog, is recorded and a light beam is transmitted through the record medium with the intensity of the beam being modulated as a function of the recorded information.

In practical embodiments of the foregoing, the density of the recorded information is relatively high. For the example wherein video information is recorded as optically-detectable characteristics, sometimes referred to as a video disc, the circular tracks are spaced closely to each other, and the track width is very narrow. This increases the amount of information which can be recorded on the disc. Because the tracks are so narrow, the impinging light beam should be controlled so that it does not drift from the track being scanned. That is, the area of the impinging beam, referred to as the beam spot, generally has a diameter that is approximately equal to the width of a track, and the beam spot should be centered on the track being scanned. In this regard, tracking control apparatus is provided to detect tracking errors, or deviations, as the beam scans each track and to use the detected tracking error to adjust the position of the impinging beam so as to effectively center the spot on the scanned track.

Also, when the information recorded on a video disc is optically read, there is the possibility that the disc may not be perfectly flat on its bed. That is, if the disc is rotated on a turntable, eccentricities in the disc, in the turntable or in the rotating drive mechanism may displace the surface of the disc. In general, an objective lens is provided to focus the light beam precisely on the video disc so as to form the beam spot of desired size. However, this movement of the disc changes the distance between the objective lens and the surface thereof, thereby defocussing the impinging light beam. This has the effect of increasing the diameter of the beam spot, and therefore changes the intensity of the beam as reflected by the disc. Consequently, the modulations of the reflected beam intensity will include erroneous indications of information.

To minimize this problem of beam defocussing, a focus servo control system has been proposed whereby changes in the impinging beam focussing are detected and used to modify the relative position of the objective lens with respect to the surface of the video disc. This focus servo control system thus tends to maintain the impinging beam in a focussed condition. This servo control operation is performed by transmitting an additional light beam through the same objective lens as is used to focus the main beam and then to detect changes in the focus condition of the impinging additional beam. More particularly, the intensity of the additional beam, as reflected by the disc, is detected, and changes in this additional beam intensity are indicative of changes in the focus condition thereof. Since the same objective lens is used both for the additional beam and for the main beam, and since changes in the focus condition of the additional beam may be considered to be attributed to changes in the distance between the objective lens and the surface of the record disc, changes in the additional beam intensity are used to correspondingly change the position of the objective lens in a direction to maintain a substantially constant distance between that lens and the disc.

In order to avoid interference between the main light beam and the additional light beam, the additional beam is transmitted to a location on the objective lens which is spaced apart from the optical axis of the lens, the latter being the desired location along which the main beam is transmitted. Hence, the main and additional light beams are incident on the disc at spaced apart locations at its surface. However, the aforementioned tracking control technique which is used to control the proper tracking of the disc by the main beam also affects the location at which the additional beam impinges upon the disc. In general, the tracking control apparatus serves to simultaneously displace the transmission paths traversed by both the main beam and the additional beam. This means that the main beam may impinge upon the objective lens at a location spaced from the lens axis, and the additional beam likewise will impinge upon the objective lens at a still further spaced location. Now, if the focal surface of the objective lens is arcuate, then a displacement or shift in the locations at which the main and additional beams impinge upon the lens will result in respectively different focus conditions of these beams. In the usual focus servo control system, the objective lens will be moved in a direction to return the additional beam to its predetermined, focussed condition. However, because of the arcuate focal surface of the objective lens, the desired focus condition of the additional beam, which additional beam had been shifted by the tracking control apparatus, will be accompanied by a defocussed condition of the main beam which also had been shifted by the tracking control apparatus. Thus, although the usual focus servo control system operates satisfactorily in the absence of any tracking error, this servo control system provides an undesired, defocussed incident main beam in the event that a tracking error obtains.

In optical video disc playback devices, a time-base error may be present in the reproduced video signals. That is, if the rotational speed of the record disc deviates from a proper speed, this deviation results in a time-base error in the intensity modulations of the read-out beam, which time-base error appears as an error in the frequency of the reproduced chrominance component. A time-base error correcting system has been proposed for optical video disc playack devices wherein the main read-out beam is displaced in a direction along the scanning path of the beam so as to compensate for frequency changes, or time-base errors in the recovered video information. This time-base error correcting system also displaces the aforementioned additional beam and, therefore, displaces the impinging locations of the main and additional beams on the objective lens. Consequently, the focus servo control system is subjected to the same beam defocussing problem when the time-base error correcting system is operative as when the tracking error correcting system is operative.

OBJECTS OF THE INVENTION

Therefore, it is an object of the present invention to provide an improved method and apparatus for controlling the read-out light beam in an optical information playback system.

Another object of this invention is to provide a method of and apparatus for focussing a main read-out light beam in an optical read-out system which avoids the aforenoted defects of previously proposed systems.

A further object of this invention is to provide a method and apparatus for properly focussing a main read-out beam while controlling tracking errors of that beam in an optical information read-out system.

An additional object of this invention is to provide a method and apparatus for properly focussing a main read-out beam while controlling time-base errors in an optical information read-out system.

Yet another object of this invention is to provide a method and apparatus for compensating defocussing effects of a read-out light beam in an optical information read-out system, which defocussing effects may result from adjustments or changes in the transmission path traversed by the beam, such as when the beam is displaced to correct for tracking or time-base errors.

A still further object of this invention is to provide a method and apparatus for use in an optical information readout system of the type wherein a main light beam is used to recover information which had been recorded on a record medium and an additional light beam is used to control the focussing of both beams, and providing the feature of additionally controlling the focussing of the main beam in accordance with displacements of that beam relative to a predetermined optical path.

Various other objects, advantages and features of the invention will become apparent from the ensuing detailed description and the novel features will be particularly pointed out in the appended claims.

SUMMARY OF THE INVENTION

In accordance with the present invention, a process and apparatus for controlling a main beam of radiant energy in an optical information read-out system is provided. The main beam is transmitted to impinge upon and scan a record medium whereat the beam is modulated with information which is recorded on that record medium. An additional beam of radiant energy is transmitted to impinge upon the record medium, and both the main and additional beams pass through a common objective lens which is used to focus the beams. The main beam, after being modulated with information, is detected, and its transmission path, that is, the optical path traversed by at least the main beam, is adjusted in response to such detection. The additional beam is detected after impinging upon the record medium and the focussing of the main and additional beams is adjusted by moving the objective lens relative to the record medium in accordance with the detection of the additional beam. Defocussing of the main beam in the event of an adjustment in the transmission path traversed thereby is minimized by further adjusting the focussing of the main and additional beams by further moving the objective lens as a function of the adjustment of the transmission path of the main beam, which adjustment is made in response to the aforementioned detection of the main beam.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

Figure 1:
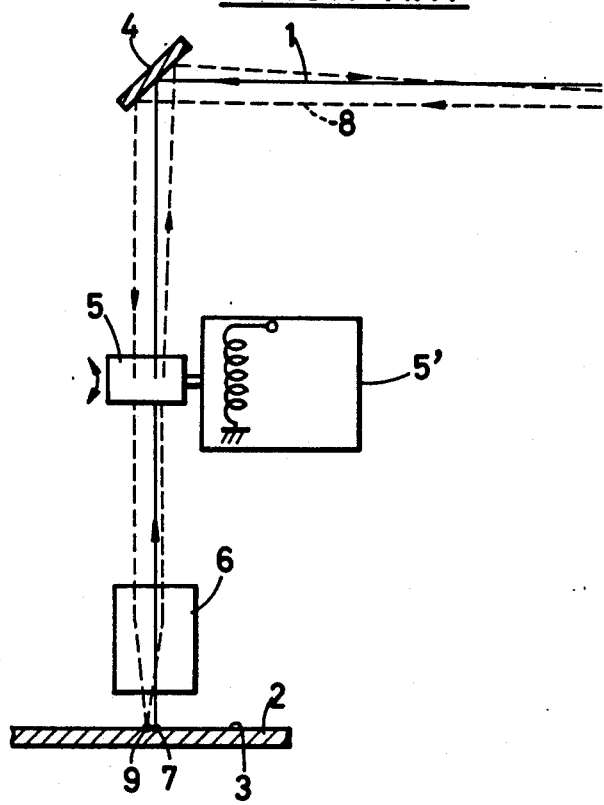
FIG. 1 is a schematic diagram of a prior art beam control technique which is used in an optical information read-out system.

Before describing the present invention and advantageous results achieved thereby, reference will be made to one example of a prior art optical information read-out system employing beam control apparatus of the type schematically illustrated in FIG. 1. The illustrated apparatus is adapted to optically detect and reproduce video information which is recorded on a rotatable video disc. Typically, this information is recorded in concentric, circular tracks, and is represented by successive pits of selectively different dimensions. In the prior art apparatus shown, a main light beam 1 is transmitted and directed upon the surface 3 of a video disc 2, the video disc being rotated by suitable rotary drive apparatus, not shown. The optical path traversed by beam 1 is shown as a folded path defined by a reflecting surface 4, referred to hereinafter as a tracking control mirror for a purpose to be described. An additional reflecting surface 5, referred to hereinafter as a time-base correcting mirror, also is selectively interposed in the optical path, and an objective lens 6 is provided to focus light beam 1 to a spot 7 on surface 3. Thus, light beam 1, which may be laser beam generated by a conventional laser source, is transmitted to tracking control mirror 4 and is reflected thereby to time-base correcting mirror 5 through objective lens 6 to be focussed at spot 7 on surface 3 of video disc 2. Thus, as disc 2 rotates, light beam 1 is modulated with the video information which is recorded on disc 2 in the form of the aforementioned pits.

Typically, the modulated light beam is reflected from disc 2, and suitable photo-detecting apparatus is disposed to receive the reflected, modulated light beam so as to convert the modulations into corresponding electrical signals which then can be recovered and processed to display a video picture. More particularly, the modulation of light beam 1 by the video information which is recorded on disc 2 is in the form of intensity modulations, and the photo-detecting apparatus generates varying electrical signals, such as amplitude-modulated signals, corresponding to the intensity modulations of the light beam.

As mentioned previously, each of the concentric tracks in which the video information is recorded is extremely narrow. Furthermore, the concentric tracks are spaced very closely to each other. Hence, it is important that focussed spot 7 of light beam 1 be maintained in proper juxtaposition relative to each track which is scanned. Desirably, focussed spot 7 should be centered on each track. If this spot drifts from its desired juxtaposition, such as due to eccentricities in the track, the disc, or the beam transmission parameters, tracking control apparatus is provided to restore the focussed spot to such desired juxtaposition. In this regard, tracking control mirror 4 is movable so as to alter the optical path from the mirror to surface 3 of disc 2. Consequently, in accordance with the movement of tracking control mirror 4, beam 1 is displaced in a direction which tends to return it to its desired juxtaposition relative to the track being scanned. Control over tracking mirror 4 is achieved by a servo control circuit (not shown) which includes a photo-detector disposed in the reflective path of beam 1 from the surface 3 of disc 2, the photo-detector generating an output signal whose magnitude varies with the intensity of the reflected light beam. In this servo control circuit, intensity modulations of the light beam due to the recorded video information are disregarded. Hence, an average intensity level is detected, and as this average level changes because of a drift in the focussed spot 7 relative to the track being scanned, the signal level produced by the photo-detector likewise varies. This change in the signal level is used as a drive signal to move tracking control mirror 4 in a direction whereby the change in the signal level, that is, the change in the average intensity of the reflected light beam, is cancelled. Hence, this tracking servo control circuitry tends to maintain focussed spot 7 in its desired juxtaposition relative to the track being scanned, thereby controlling the tracking of the light beam.

As mentioned previously, a time-base error may occur in the video signals which are recovered from the intensity-modulated light beam which is reflected from surface 3 of disc 2. These time-base errors may be attributed, at least in part, to a change of fluctuation in the rotary speed of disc 2. The purpose of time-base correcting mirror 5 is to advance or retard focussed spot 7 in the direction of the track being scanned so as to compensate for the time-base errors. For example, if the rotary speed of disc 2 is reduced, the frequency of the recovered video information, such as the chrominance subcarrier frequency, likewise will be reduced. To compensate for this time-base error, time-base correcting mirror 5 is moved so as to advance focussed spot 7, thereby having the result of increasing the effective rotary speed of disc 2 and thus restoring the frequency of the chrominance subcarrier to its proper frequency. Conversely, if the rotary speed of disc 2 increases so as to increase the frequency of the chrominance subcarrier of the recovered video information, time-base correcting mirror 5 is moved to retard focussed spot 7, having the result of decreasing the effective rotary speed of disc 2 and thus decreasing the chrominance subcarrier frequency. This bidirectional movement of time-base correcting mirror 5 is represented by the double arrowhead shown in FIG. 1. A suitable mirror driving mechanism 5' is coupled to time-base correcting mirror 5 and is supplied with a detected time-base error signal. This signal is produced by time-base error detecting circuitry (not shown), which circuitry detects the intensity-modulated reflected beam 1 so as to recover the readout video information therefrom.

Objective lens 6 is adapted to focus beam 1 as spot 7 on the surface 3 of disc 2, as aforesaid. Since the focal plane (more accurately, the focal surface) of objective lens 6 is fixed, any disturbance in the surface 3 of disc 2 relative to this focal plane results in defocussing of spot 7. As shown in FIG. 1, this defocussing is achieved in the event of any up-and-down movement of disc 2. This movement may be caused by eccentricities in the disc, the rotary drive mechanism for the disc, or other external factors which may introduce "bounce" into the rotation of the disc. In order to compensate for this displacement of the surface of disc 2 relative to objective lens 6, a focus servo control system is provided to detect the focus condition of the lens and then to adjust the position of the lens in order to compensate for any detected defocussing. In this regard, an additional light beam 8 is generated and is transmitted to objective lens 6 via an optical path which generally is parallel to the optical path traversed by main beam 1. As shown in FIG. 1, additional beam 8 impinges upon lens 6 at a location which is spaced from the impinging location of beam 1. Hence, additional beam 8 is focussed by lens 6 to a spot 9 which is spaced from focussed spot 7 of the main beam. Consequently, additional beam 8 does not influence the intensity modulations of beam 1, and does not introduce a crosstalk component into the detected intensity modulations of this main beam.

In the focus servo control system, additional beam 8, after being focussed to spot 9, is reflected from surface 3 of disc 2, and the intensity of this reflected additional beam is detected. Any change in the focus condition of additional beam 8 results in a concurrent change in the intensity of the reflected additional beam. Therefore, by detecting the intensity of the additional beam, the focus condition of additional beam 8 may be determined. Furthermore, since objective lens 6 is common to both the main and additional light beams, a defocussing of additional beam 8 is accompanied by a concurrent defocussing in main beam 1. The focus servo control system corrects for the defocussing of the additional beam, and thus simultaneously corrects for the accompanying defocussing of the main beam.

Figure 2:
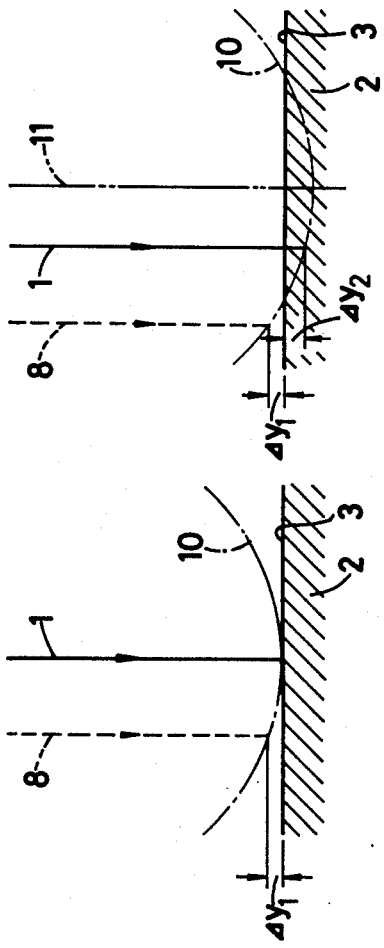
FIGS. 2A and 2B are representations of impinging light beams in accordance with prior art techniques, and are useful in understanding the improved results achieved by the present invention.

Referring to FIG. 2A, a representation of the proper focussing condition of objective lens 6 is shown. The focal plane of the objective lens actually is a focal surface 10 and is approximately parabolic. This parabolic focal surface 10 is attributed to the arcuate aberration of the image field. Therefore, since main beam 1 and additional beam 8 impinge upon objective lens 6 at different locations, the focal point along focal plane 10 for the main beam differs from the focal point of the additional beam. If it is assumed that main beam 1 is transmitted along the optical axis of the objective lens, then a proper focussing condition of this lens will focus the main beam exactly at the surface 3 of disc 2, while additional beam 8 will be focussed along focal plane 10 spaced apart from the focussed main beam. This means that the focussed spot of the additional beam is at a distance $\Delta Y_1$ above the surface 3. The focus servo control system is adapted to adjust objective lens 6 such that the intensity of the additional beam as reflected from the surface 3 of disc 2 is of a level which corresponds to the focussing of the additional beam at a distance $\Delta Y_1$ above the surface of the disc. During normal operation of the optical read-out system, when objective lens 6 focusses additional beam 8 at a distance $\Delta Y_1$ above the surface 3 of disc 2, main beam 1 is "just focussed" on the surface of the disc. Thus, even though the additional beam is not focussed precisely on the surface of the video disc, main beam 1 is, and the size of the focussed spot of the main beam is equal to the desired, predetermined size.

FIG. 2B illustrates the results of the prior art focus servo control system in the event that a tracking error correcting operation and/or a time-base error correcting operation is performed by mirrors 4 and/or 5. Let it be assumed that a tracking error correcting operation is performed whereby tracking control mirror 4 is moved so as to displace the optical path traversed by beams 1 and 8. If the optical axis of objective lens 6 is designated by reference numeral 11, then a lateral displacement in beams 1 and 8 by tracking control mirror 4 results in a displacement of the locations at which these beams impinge upon the lens. Hence, main beam 1 is displaced from optical axis 11, and additional beam 8 is correspondingly displaced so as to maintain its spaced-apart relation with respect to beam 1. This lateral displacement of both beams is shown in FIG. 2B. Now, if the focus servo control system is operated to maintain the focussed spot of additional beam 8 at a distance $\Delta Y_1$ above the surface 3 of disc 2, main beam 1 no longer will be just focussed at the surface of the disc. Rather, main beam 1 still will be focussed at the focal surface 10 of objective lens 6, but because of the lateral displacement of the beams, and because of the maintenance of the focussed spot of beam 8 above the surface of disc 2, the focussed spot of beam 1 now will be below the surface 3 by a distance $\Delta Y_2$. Thus, it is seen that in the prior art focus servo control system wherein the focussed condition of objective lens 6 is determined exclusively by detecting the reflective intensity of additional beam 8, a properly focussed condition will be assumed when, in fact, main beam 1 is defocussed because of a change in its transmission path. Because of this defocussing of the main beam, its intensity at incidence is reduced, thus reducing the modulation intensity of the reflected main beam. Consequently, when the intensity-modulated beam is detected, the video signals reproduced therefrom are deteriorated, thereby degrading the resultant video picture.

The defocussing condition shown in FIG. 2B is further expanded if the amplitude of movement of tracking control mirror 4 is increased. That is, if the tracking control mirror is permitted to move to a greater extent, main beam 1 will be greatly defocussed. To avoid this, the gain of the tracking servo control system generally is reduced. Unfortunately, this means that the stability of the tracking servo control system is deteriorated.

Figure 3:
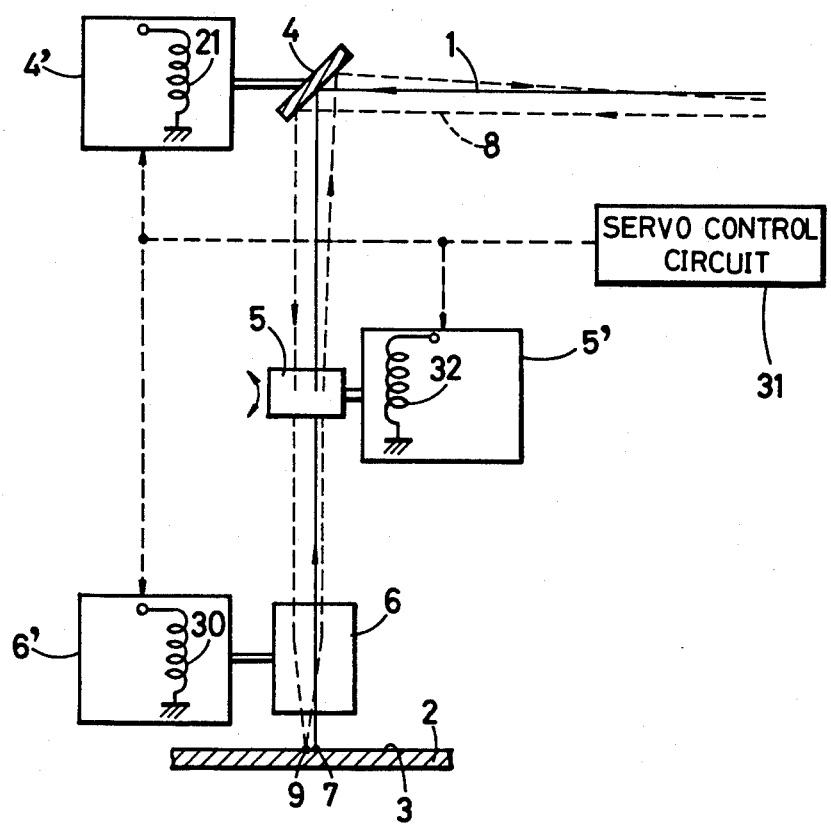
FIG. 3 is a schematic representation of one embodiment of beam control apparatus which can be used to carry out the objectives of the present invention.

The aforenoted problems inherent in prior art optical read-out systems are avoided by the present invention. Referring now to FIG. 3, one embodiment of this invention is shown schematically, and many of the elements of FIG. 3 are similar to corresponding elements described previously with respect to FIG. 1 and are identified by the same reference numerals. The additional elements shown in FIG. 3 include a tracking control mirror drive mechanism 4' which is shown to be mechanically coupled to tracking control mirror 4 and includes a drive element 21, such as a coil, a piezo-electric element, a variable-length resistive wire or other component capable of imparting movement to mirror 4 in response to a control signal applied thereto. Also, time-base error correcting mechanism 5' is shown to include a drive element 32, which may be similar to drive element 21, mechanically coupled to time-base correcting mirror 5. Still further, the aforementioned focus servo control system now is shown as block 6' including a drive element 30, which may be similar to drive element 21, mechanically coupled to objective lens 6 and adapted to adjust the effective focussing condition of the objective lens, such as by changing its relative position with respect to the surface 3 of video disc 2. A servo control circuit 31, which may include various individual yet interdependent control circuits, is coupled to tracking control mirror drive circuit 4', time-base correcting mirror drive circuit 5' and focus servo control system 6', and is operative to control these respective circuits.

The overall optical system shown in FIG. 3 is substantially identical to the optical system described previously with respect to FIG. 1. Accordingly, main light beam 1 and additional light beam 8 both traverse respective optical paths defined by tracking control mirror 4, time-base correcting mirror 5 and objective lens 6. Lens 6 is effective to focus beam 1 onto the surface 3 of disc 2 as a focussed spot 7, while focussing beam 8 as focussed spot 9.

Figure 4:
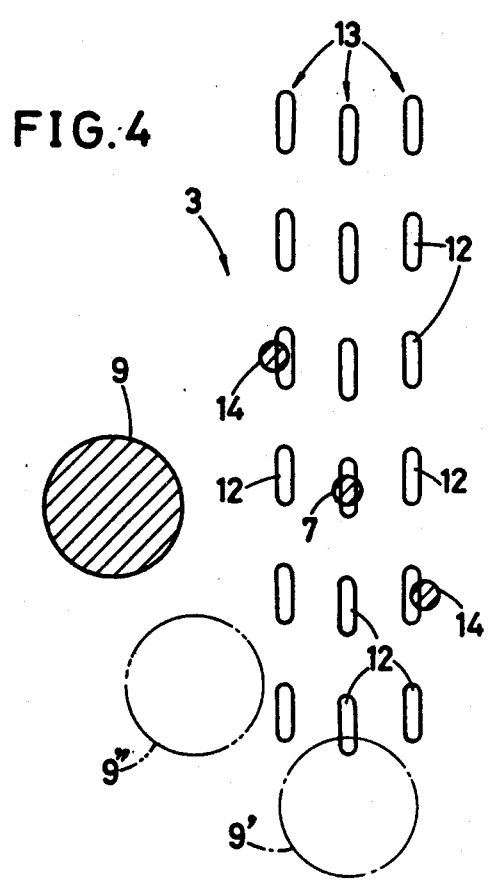
FIG. 4 represents a light beam incident on optically readable information which is useful in understanding the present invention.

The manner in which the optical control system controls beam 1 so as to read out the optically detectable information on the surface 3 of disc 2 is depicted in FIG. 4. In the example of FIG. 4, the recorded information is in the form of pits 12 which are recorded in concentric record tracks 13. In one example, these record tracks may form a continuous spiral. In an alternative embodiment, these record tracks are individual, concentric circular tracks. In both embodiments, adjacent tracks may be considered to be essentially concentric and circular.

A properly focussed beam spot 7 is shown in middle track 13, and this properly focussed spot also is disposed in its proper tracking relation with respect to this track. A tracking error in beam spot 7 is shown as a lateral displacement of the spot from the record track. This lateral displacement may be in, for example, a radially outward direction or in a radially inward direction. Beam spots 14 superimposed over the left-most and right-most tracks represent the lateral displacement, or tracking error, in the main beam, which displacement is shown in the radial direction.

FIG. 4 also shows the relation of beam spot 9 on the surface 3 of disc 2 relative to focussed main beam spot 7. The focus servo control system is operative to focus additional beam 8 at a distance $\Delta Y_1$ above the surface 3. Hence, additional beam spot 9 which is formed on the surface of the disc is seen to be enlarged. Spot 9, which is spaced from focussed spot 7 in the radial direction, is sufficiently large to encompass plural record tracks 13. Hence, intensity modulations of the reflected additional beam due to the recorded video signals are avoided. This means that the intensity of the signals reproduced from the reflected additional beam essentially is attributed to the size of beam spot 9 and, therefore, to the focus condition of objective lens 6. Any change in the beam spot is indicative of a change in the focus condition of the lens and this change is detected as a corresponding change in the intensity of the reflected additional beam. In this manner, the focus servo control system is capable of sensing a defocussing condition of the objective lens, and functions to correct this defocussing.

Figure 5:
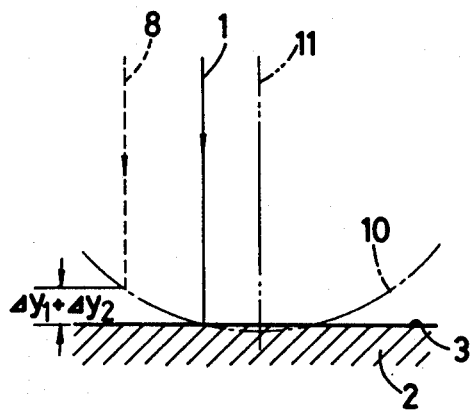
FIG. 5 represents the manner in which light beams used in an optical information read-out system are controlled by the present invention.

In accordance with one feature of the present invention, the focus servo control system is operative in a manner such that a change in the optical or transmission paths traversed by main beam 1 and additional beam 8 does not result in a defocussing condition such as was described previously with respect to FIGS. 2A and 2B. Referring to FIG. 5, let it be assumed that a tracking correction operation is performed. That is, if focussed spot 14 is not properly juxtaposed with respect to record track 13, such as shown in FIG. 4, servo control circuit 31 (FIG. 3) energizes tracking control circuit 4' to move tracking control mirror 4. This displaces main beam 1 and additional beam 8 from their predetermined impinging locations on objective lens 6. This displacement of beams 1 and 8 is shown in FIG. 5. In the similar tracking control operation performed by the prior art, and discussed with respect to FIG. 2B, the focus servo control system was operated to adjust objective lens 6 such that the focussed spot of beam 8, such as spot 9, was disposed at a distance $\Delta y_1$ above the surface 3 of disc 2. It is recalled that this resulted in a defocussing of main beam 1. By the present invention, described in greater detail below, the amount of displacement of the main and additional beams produced by the tracking control operation is taken into account in the operation of focus servo control system 6'. Thus, rather than adjusting lens 6 so that focussed spot 9 of additional beam 8 is maintained a distance $\Delta y_1$ above disc 2, lens 6 is adjusted such that focussed spot 9 is positioned above the surface 3 by a distance $\Delta y_1 + \Delta y_2$. By adjusting lens 6 in this manner when a tracking control operation is performed, main light beam 1 is focussed precisely on the surface of the video disc. Thus, defocussing effects of the main beam which otherwise would occur if focus servo control system 6' is operated solely in response to the detected intensity of the reflected additional beam, are avoided. That is, displacement of the beams, and particularly the main beam, relative to their predetermined impinging locations on objective lens 6 is taken into account.

The foregoing is achieved by providing the focus servo control system with a degree of dependence upon the operation of the tracking servo control system. This is shown more particularly in the block diagram of FIG. 6. An embodiment of the tracking control circuit is comprised of a photo-detector 16, an amplifier 17, a filter 18, a power amplifier 20 and a tracking control mirror drive element 21 included in aforementioned tracking control drive mechanism 4'. Photo-detector 16 is positioned so as to receive at least a portion of the modulated main light beam 1 which is reflected from surface 3 of disc 2. This reflected, intensity-modulated light beam is represented as beam 15 in FIG. 6. Photo-detector 16, which is a conventional element, is responsive to the intensity of reflected beam 15 to produce an electrical signal whose magnitude is representative of the reflected beam intensity. Photodetector 16 is coupled to amplifier 17 such that the signals representing the intensity of reflected beam 15 are amplified. The output of amplifier 17 is coupled through a filter 18 and another amplifier 19 to power amplifier 20. Filter 18 is adapted to compensate the phase of the amplified intensity-representing signals, and amplifier 19 together with power amplifier 20 further amplify the phase-compensated signals to a suitable level for application to drive element 21. As discussed previously with respect to FIG. 3, drive element 21 may comprise a coil, a piezoelectric element, a variable-length resistive wire or other suitable drive element for moving tracking control mirror 4. Hence, depending upon the magnitiude of the intensity-representing signals produced by photo-detector 16, tracking control mirror 4 is adjusted to correspondingly adjust or displace the transmission paths traversed by main beam 1 and additional beam 8. As these transmission paths are displaced, focussed spot 7 is returned to its proper juxtaposition relative to track 13. This shift in the focussed spot is accompanied by a corresponding change in the intensity of light beam 1 as reflected from the surface 3 of disc 2. Consequently, the intensity of reflected beam 15 also changes to produce a concurrent in the intensity-representing signals produced by photo-detector 16. In this manner, the illustrated tracking servo control circuit provides suitable control over light beam 1 to maintain this beam in its proper position while scanning track 13.

Figure 6:
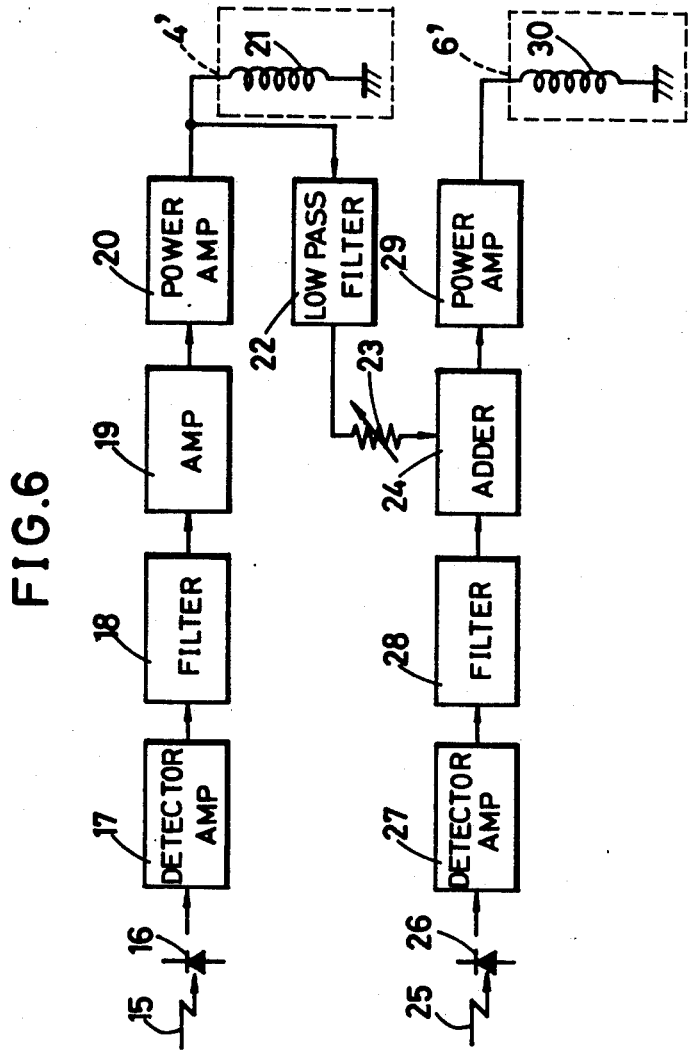
FIG. 6 is a block diagram of one example of electrical control apparatus which can be used with the present invention.

FIG. 6 also illustrates an embodiment of focus servo control system 6' comprised of a photo-detector 26, an amplifier 27, a filter 28, an adder 24, a power amplifier 29 and drive element 30. Photo-detector 26 is adapted to receive at least a portion of additional beam 8 which is reflected from the surface of video disc 2. In FIG. 6, the reflected additional beam is identified by reference numeral 25 and impinges upon photo-detector 26 such that the photo-detector produces a signal representing the intensity of reflected additional beam 25. Photo-detector 26 is coupled to amplifier 27 which is adapted to amplify the intensity-representing signals produced by this photo-detector, and the amplified signals are supplied through filter 28 and adder 24 to power amplifier 29. Filter 28 functions to compensate the phase of the amplified intensity-representing signals, and these phase-compensated signals are supplied to power amplifier 29 for further amplification and application to drive element 30. If the predetermined focussing of additional beam 8 is disturbed, as by a change in the distance between objective lens 6 and surface 3 of video disc 2, the intensity of reflected beam 25 will change in a corresponding manner. This change in intensity results in a concurrent change in the intensity-representing signal produced by photo-detector 26, which change is amplified and supplied to power amplifier 29, whereby drive element 30 is driven in a direction to adjust the position of objective lens 6 whereby the aforementioned defocussing of additional beam 8 is corrected. In the absence of a tracking control operation, the refocussing of additional beam 8 is accompanied by a refocussing of main beam 1 to produce the desired focussed spot 7 on surface 3 of disc 2.

In the embodiment shown in FIG. 6, a low-pass filter 22 and adjustable attenuator 23 are provided between the output of power amplifier 20 of the tracking servo control circuit and the input of adder 24 of the focus servo control circuit. The purpose of low-pass filter 22 is to remove the high frequency components which may be present in the drive signal applied to drive element 21. These high frequency components may be present in the event that tracking control mirror 4 is oscillated to correct for tracking errors which may be present at a high frequency. Accordingly, the output of low-pass filter 22, although related to the tracking error correcting signal supplied by power amplifier 20 to drive element 21, is of a low frequency which may be, for example, less than the rotation frequency of disc 2. This low frequency output from filter 22 is adjusted to a suitable level by variable attenuator 23. In one embodiment, variable attenuator 23 may comprise a potentiometer or rheostat, and other attentuating devices also are contemplated. As an alternative, a level adjust circuit may be substituted for variable attenuator 23, suitable level adjust circuits including variable gain amplifiers and other controllable level-changing circuits.

It is appreciated that adder 24 adds the phase-compensated intensity-representing signal produced by photo-detector 26 to the filtered error-correcting signal derived from photo-detector 16. This portion of the error-correcting signal which is applied to adder 24 functions to impart a control signal to drive element 30 which moves objective lens 6 by the distance $\Delta y_2$ (FIG. 5) so as to compensate for defocussing which otherwise would occur when beams 1 and 8 are displaced by the tracking servo control circuit. That is, the intensity-representing signal produced by photo-detector 26 functions to position lens 6 whereby additional beam 8 is focussed at a point located above surface 3 of disc 2 by a distance $\Delta y_1$. The additional focus control signal derived from the tracking error signal and supplied to adder 24 by low-pass filter 22 and variable attenuator 23 functions to further position lens 6 such that the lens focusses additional beam 8 at a further distance $\Delta y_2$ above surface 3. Hence, the combination of the two focus control signals serves to position lens 6 whereby additional beam 8 is focussed at the distance $\Delta y_1 + \Delta y_2$ above surface 3 of disc 2. As shown in FIG. 5, this distance is the amount needed to precisely focus main beam 1 on the surface of the disc. With the focus servo control system shown in FIG. 6, objective lens 6 is moved as a function of the usual focus control signal derived from photo-detector 26 as well as the further focus control signal derived from the tracking error signal produced by photo-detector 16. The combination of these signals tends to move the focal surface 10 of the objective lens by the amount $\Delta y_1$, and by the additional amount $\Delta y_2$ shown in FIG. 2B, thereby focussing beam 1 on the surface of the video disc, as desired.

Thus, it is seen that the focus servo control system of the present invention avoids the defocussing problem which accompanies a tracking control operation, as described previously with respect to FIG. 2B. This means that even if the video disc has a substantial eccentricity, focussing of the main beam nevertheless is achieved, and the size and intensity of the incident readout beam are of proper levels. The recorded video information thus can be reproduced accurately from such a disc. Furthermore, since main beam 1 is properly focussed during a tracking control operation, the main beam can be further displaced by tracking control mirror 1 so that even larger tracking errors can be corrected. Thus, the gain of the tracking servo control circuit can be maintained relatively high so as to stabilize this circuit.

Figure 7:
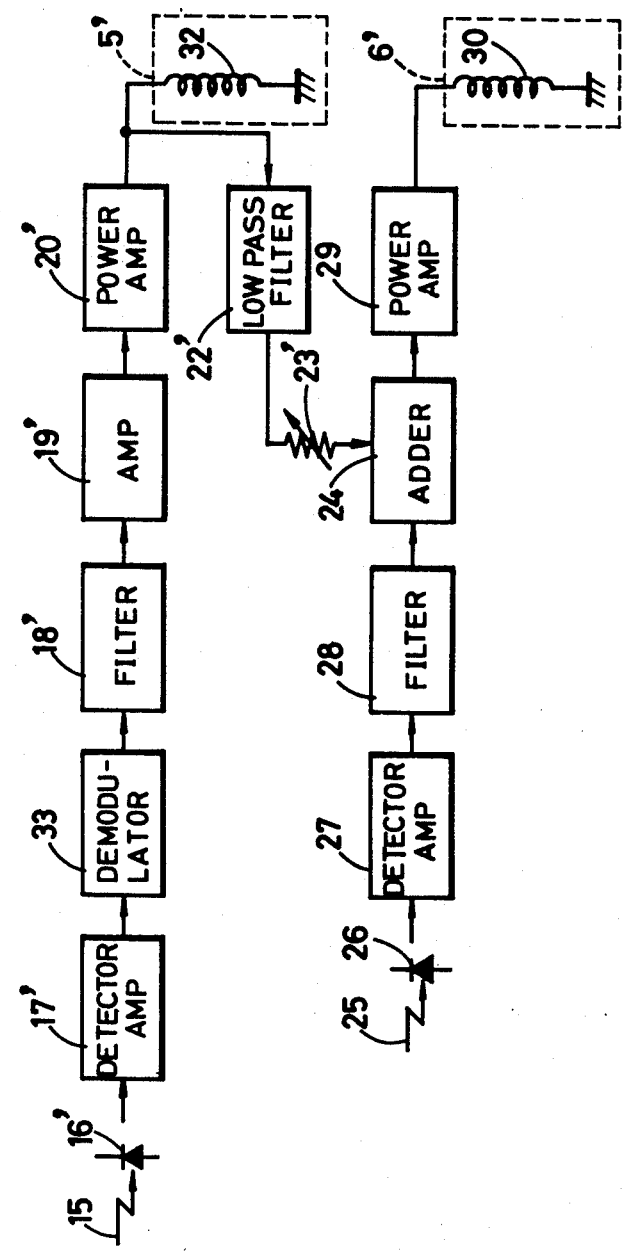
FIG. 7 is a block diagram of another example of electrical control apparatus which can be used with the present invention.

The focus servo control circuit shown in FIG. 6 is seen to be responsive to the tracking error signal so as to avoid defocussing of main beam 1 during a tracking control operation. If additional beam spot 9 is spaced radially from main beam spot 7, as has been assumed in FIG. 4, then adjustments to the transmission paths traversed by the main and additional beams by time-base correcting mirror 5 will not affect the focussing of these beams by objective lens 6. That is, since time-base correcting mirror 5 will displace the beams in the direction of record track 13, the beams still will be focussed by the objective lens on the parabolic-shaped focal surface 10 at the same locations as shown in FIG. 5. However, the spaced-apart location of additional beam spot 9 with respect to main beam spot 7 need not be limited solely to the radial direction of disc 2. Additional beam 8 still can be used to detect the focus condition of objective lens 6 if beam spot 9 is spaced apart from beam spot 7 in the direction along track 13, such as shown by beam spot 9' in FIG. 4. If beam spot 9' is spaced from beam spot 7 in the direction of the record track, then changes in the transmission paths traversed by the main and additional beams due to movement of tracking control mirror 4 will not disturb the focus condition of the main beam. However, when beam spot 9' is spaced from beam spot 7 in the direction of record track 13, a displacement in the paths traversed by the main and additional beams by time-base correcting mirror 5 will have a similar effect upon the defocussing of main beam 1 as was discussed previously with respect to the defocussing caused by the tracking control mirror, and illustrated in FIG. 2B. Apparatus to compensate for the defocussing effect when a time-base correcting operation is performed is illustrated in FIG. 7. This apparatus includes a time-base servo control circuit and a focus servo control circuit. The focus servo control circuit is substantially identical to the previously described focus servo control circuit shown in FIG. 6, and like components are identified by the same reference numerals. The time-base servo control circuit is analogous to the aforedescribed tracking servo control circuit, and like components are identified by the same reference numerals, but with the addition of a prime. Thus, the time-base servo control circuit is formed of photodetector 16', which is adapted to produce signals representing the intensity of reflected main light beam 15, amplifier 17' coupled to photo-detector 16' for amplifying the intensity-representing signals, a demodulator 33, to be described, filter 18' for phase compensation, amplifier 19' and power amplifier 20' for applying an amplified time-base correcting signal to drive element 32 so as to adjust time-base correcting mirror 5 in a direction to eliminate the time-base error.

It is recalled that a time-base error will appear as a deviation in the frequency of the chrominance subcarrier of the reproduced video signals from the correct chrominance subcarrier frequency. Demodulator 33 receives the amplified intensity-representing signals produced by photo-detector 16' and demodulates these amplified signals so as to recover the video information which is represented by the intensity-modulations of reflected beam 15. Accordingly, demodulator 33 includes conventional demodulating circuitry for demodulating the chrominance signal, and particularly the chrominance subcarrier, from the recovered video signals. As one example, demodulator 33 may include a burst gate and conventional gate control circuitry to recover the reproduced burst signal from the demodulated video signal. The frequency of the burst signal, that is, the frequency of the chrominance subcarrier, is compared to the frequency of a reference signal which may be produced by a controlled reference oscillator.

Any difference between the frequencies of these compared signals is indicative of a time-base error. Accordingly, the error signal which is produced by this frequency comparison is supplied through filter 18' and is amplified by amplifier 19' and power amplifier 20' for application as a control signal to drive element 32. Thus, time-base correcting mirror 5 is moved, such as angularly displaced, in accordance with this error signal so as to displace beams 1 and 8 in a direction to correct the time-base error.

The time-base correcting signal is supplied through low-pass filter 22' and variable attenuator 23' to adder 24 of the focus servo control circuit shown in FIG. 7. Hence, the time-base correcting signal is added to the focus control signal in a manner similar to the addition of the aforedescribed tracking correcting signal to the focus control signal. Accordingly, if additional beam spot 9' is spaced from main beam spot 7 in the direction of record track 13, the apparatus shown in FIG. 7 compensates for defocussing of main beam 1 which otherwise would occur if the focussing servo control circuit was completely independent of the time-base servo control circuit. It may be appreciated that this defocussing compensation during a time-base correcting operation is very similar to the defocussing compensation during a tracking control operation. Thus, with the apparatus shown in FIG. 7, the time-base correcting signal is used to adjust objective lens 6 by a distance $\Delta y_2$ in order to obtain the correct focussing of light beam 1 as shown in FIG. 5.

The apparatus shown in FIG. 6 represents servo control circuit 31 (FIG. 3) when additional beam sport 9 is spaced from main beam spot 7 in the radial direction. The apparatus illustrated in FIG. 7 represents servo control circuit 31 in the event that additional beam spot 9' is spaced from main beam spot 7 in the direction along record track 13. It is appreciated that the additional beam spot may be spaced from the main beam spot in a direction which is oblique both to the radial and the record track directions, such as represented by additional beam spot 9'' in FIG. 4. In that event, servo control circuit 31 may be formed of the apparatus shown in FIG. 6 as well as the apparatus shown in FIG. 7. In that embodiment, adder 24 is provided with three inputs, a first connected to receive the focus control signal derived from photo-detector 16, the second adapted to receive the tracking control signal derived from photo-detector 16 and the third adapted to receive the time-base control signal derived from photo-detector 16'. Defocussing of the main beam which may be due to movement of tracking control mirror 4 and/or movement of time-base correcting mirror 5 thus is compensated.

While the present invention has been particularly shown and described with reference to preferred embodiments thereof, it will be readily apparent that various changes and modifications in form and details may be made by one of ordinary skill in the art without departing from the spirit and scope of the invention. Other optical devices can be used to define the optical paths traversed by the main and additional beams. These optical devices may be suitably driven to perform tracking control, time-base correcting and focus control operations, respectively. Nevertheless, the focus control operation will be dependent upon the additional light beam and, additionally, the extent to which the main beam is displaced from its reference optical path, such as from optical path 11 shown in FIG. 5. Also, although it has been assumed in the foregoing description that the main and additional light beams are reflected from the record medium, e.g., disc 2, the record medium may be a transparent carrier for optically detectable information indicia. In that event, the light beams may be transmitted through the carrier and suitably detected after emerging from the other, or back surface of the carrier. It is intended that the appended claims be interpreted to include the specifically described as well as other equivalent embodiments of the present invention.

What is claimed is:

1. In a process for optically reading information from a record medium wherein a main beam of radiant energy is transmitted to impinge upon and scan said record medium whereat said main beam is modulated with said information while scanning said record medium and an additional beam of radiant energy is transmitted to impinge upon said record medium, both said main beam and said additional beam passing through a common objective lens for focussing of said beams, said process including detecting said main beam after said main beam is modulated with said information, adjusting the transmission path of at least said main beam in response to the detection of said main beam, detecting said additional beam after said additional beam impinges upon said record medium, and adjusting the focussing of said main and additional beams by moving said objective lens relative to said record medium in accordance with the detection of said additional beam, the method of minimizing defocussing of said main beam in the event of a transmission path adjustment thereof comprising further adjusting the focussing of said main and additional beams by further moving said objective lens as a function of the adjustment of said transmission path of said main beam in response to said detection of said main beam.

2. The method of claim 1 wherein the transmission paths of both said main and additional beams are adjusted simultaneously in response to the detection of said main beam.

3. The method of claim 2 wherein the transmission paths of said main and additional beams are adjusted to scan predetermined tracks on said record medium and wherein the step of detecting said main beam comprises reflecting said main beam from said record medium and detecting the intensity of the reflected main beam, said intensity being proportional to a tracking error, and the step of adjusting the transmission paths of said main and additional beams comprises displacing said main and additional beams transversely of said predetermined tracks in response to a change in the detected intensity of said reflected main beam; and said step of further adjusting the focussing of said main and additional beams comprises moving said objective lens as a function of the detected change in intensity of said reflected main beam.

4. The method of claim 2 wherein the main and additional beams scan predetermined tracks on said record medium and wherein the step of detecting said main beam comprises reflecting said main beam from said record medium and detecting a time-base error in the information modulations of said main beam, and the step of adjusting the transmission paths of said main and additional beams comprises displacing said main and additional beams in the direction of a predetermined track; and said step of further adjusting the focussing of said main and additional beams comprises moving said objective lens as a function of the detected time-base error.

5. In a system for optically reading information which is recorded on a record medium, including means for transmitting a main light beam and an additional light beam onto said record medium for scanning said record medium by said main light beam, whereby said main light beam is modulated with the recorded information, a common objective lens for focussing both said main and additional light beams, beam path control means responsive to said main light beam for adjusting the paths traversed by said main and additional light beams, and focus control means coupled to said objective lens for adjusting the relative position of said objective lens with respect to said record medium in response to a change in the focussing condition of said additional light beam, apparatus for compensating the defocussing of said main light beam resulting from adjustments in the paths traversed by said main and additional light beams comprising means for generating signals proportional to the adjustments to said paths traversed by said main and additional light beams by said beam path control means; and means for applying said proportional signals to said focus control means to adjust the relative position of said objective lens as a function of said adjustments to said paths traversed by said main and additional light beams.

6. The apparatus of claim 5 wherein said additional light beam impinges upon said record medium and said focus control means comprises detecting means for detecting the additional light beam which is transmitted from said record medium to produce a focus control signal in accordance with said detected additional light beam; lens adjustment means for adjusting said relative position of said objective lens in response to a control signal applied thereto; and combining means for combining said focus control signal and said proportional signals to apply said control signal to said lens adjustment means.

7. The apparatus of claim 6 wherein said main and additional light beams impinge upon said record medium at spaced apart locations and are reflected by said record medium; said detecting means including a photodetector for detecting the intensity of the additional light beam reflected by said record medium; and said combining means comprising an adding circuit.

8. The apparatus of claim 6 wherein said main and additional light beams impinge upon said record medium at spaced apart locations and are reflected therefrom; and said beam path control means comprises tracking control means for controlling at least said main light beam to scan predetermined tracks of said record medium.

9. The apparatus of claim 8 wherein said tracking control means comprises a photodetector for detecting the intensity of said main light beam reflected from said tracks of said record medium to produce a tracking control signal in accordance with the deviation of said main light beam from a predetermined track; means for defining the paths traversed by said main and additional light beams to impinge upon said record medium; and drive means responsive to said tracking control signal and coupled to said path defining means for adjusting said paths such that said main light beam is caused to scan said predetermined track.

10. The apparatus of claim 9 wherein said combining means comprises an adding circuit; and said means for applying said proportional signals to said focus control means comprises a low-pass filter for receiving said tracking control signal, and attenuating means for coupling the output of said low-pass filter to said adding circuit whereat said tracking control signal is added to said focus control signal to produce a control signal; and wherein said lens adjustment means comprises lens drive means coupled to said objective lens and having a control signal input coupled to said adding circuit output to receive the control signal and correspondingly change the position of said objective lens.

11. The apparatus of claim 6 wherein said main and additional light beams impinge upon predetermined tracks of said record medium at spaced apart locations and are reflected therefrom; and said beam path control means comprises time-base error control means for correcting a time-base error in the information modulations of said reflected main light beam.

12. The apparatus of claim 11 wherein said time-base error control means comprises a photodetector for detecting the modulated intensity of said main light beam reflected from said record medium, a demodulator for demodulating the detected modulated intensity of said main light beam to recover the information recorded on said record medium and for producing a correcting signal in accordance with a deviation of the time-base of said demodulated information from a predetermined time-base; means for defining the paths traversed by said main and additional light beams to impinge upon said record medium; and drive means responsive to said correcting signal and coupled to said path defining means for adjusting said paths in the direction of a predetermined track being scanned to correct said time-base of said demodulated information.

13. The apparatus of claim 12 wherein said combining means comprises an adding circuit; and said means for applying said proportional signals to said focus control means comprises a low-pass filter for receiving said correcting signal, and attenuating means for coupling the output of said low-pass filter to said adding circuit whereat said correcting signal is added to aid focus control signal to produce a control signal; and wherein said lens adjustment means comprises lens drive means coupled to said objective lens and having a control signal input coupled to said adding circuit output to receive the control signal and correspondingly change the position of said objective lens.

14. Apparatus for controlling the optical reading of information which is recorded in circular tracks on a rotatable record disc, comprising means for transmitting a main light beam and an additional light beam to said record disc; tracking control reflecting means for reflecting said main and additional light beams to said record disc to cause said main light beam to scan said circular tracks; time-base correction reflecting means for reflecting said main and additional light beams to said record disc, the combination of said tracking control reflecting means and said time-base correction reflecting means defining an incident light path; an objective lens disposed in said incident light path for focussing both said main and additional light beams impinging upon said record disc; tracking control signal generating means responsive to the intensity of the main light beam reflected from said record disc for generating a tracking control signal which varies as a function of the deviation of said main light beam from a circular track; time-base error signal generating means responsive to the modulations of the intensity of said reflected main light beam by said recorded information on said record disc for generating a time-base error signal which varies as a function of the time-base error of said intensity modulations; means for adjusting said tracking control reflecting means in accordance with said tracking control signal to eliminate said deviation of said main light beam from said circular track; means for adjusting said time-base correction reflecting means in accordance with said time-base error signal to move said main light beam in the direction of said circular track to eliminate said time-base error of said intensity modulations; focus control signal generating means responsive to the intensity of the additional light beam reflected from said record disc for generating a focus control signal which varies as a function of the change in focus of said additional light beam; adding means for adding said focus control signal and a portion of at least one of said tracking control and time-base error signals; and means for adjusting the position of said objective lens relative to said record disc in accordance with the added signals to maintain said incident main light beam in focussed condition notwithstanding adjustments to said tracking control and time-base correction reflecting means.

* * * * *